(12) United States Patent
Jaaskelainen et al.

(10) Patent No.: US 11,149,518 B2
(45) Date of Patent: Oct. 19, 2021

(54) HYDRAULIC FRACTURING PROPPANT MIXTURE WITH SENSORS

(71) Applicant: HALLIBURTON ENERGY SERVICES, INC., Houston, TX (US)

(72) Inventors: Mikko Jaaskelainen, Katy, TX (US); Ron Dusterhof, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 61 days.

(21) Appl. No.: 16/641,315

(22) PCT Filed: Oct. 3, 2017

(86) PCT No.: PCT/US2017/054894
§ 371 (c)(1),
(2) Date: Feb. 24, 2020

(87) PCT Pub. No.: WO2019/070238
PCT Pub. Date: Apr. 11, 2019

(65) Prior Publication Data
US 2020/0393585 A1    Dec. 17, 2020

(51) Int. Cl.
*E21B 33/134* (2006.01)
*E21B 43/267* (2006.01)
*E21B 47/16* (2006.01)
*G01V 1/28* (2006.01)

(52) U.S. Cl.
CPC .......... *E21B 33/134* (2013.01); *E21B 43/267* (2013.01); *E21B 47/16* (2013.01); *G01V 1/288* (2013.01); *G01V 2210/1234* (2013.01); *G01V 2210/646* (2013.01)

(58) Field of Classification Search
CPC .. E21B 43/26; E21B 43/2605; E21B 43/2607; E21B 43/27; E21B 43/267; E21B 47/14; E21B 47/16
See application file for complete search history.

(56) References Cited

U.S. PATENT DOCUMENTS

| | | |
|---|---|---|
| 8,931,553 B2 | 1/2015 | Cannan et al. |
| 2006/0102342 A1 | 5/2006 | East et al. |
| 2011/0192597 A1 | 8/2011 | Roddy et al. |
| 2012/0013893 A1 | 1/2012 | Maida et al. |
| 2014/0374091 A1 | 12/2014 | Wilt et al. |
| 2015/0330212 A1 | 11/2015 | Sassi et al. |
| 2017/0211371 A1 | 7/2017 | Brady et al. |
| 2018/0320503 A1* | 11/2018 | Smith ............... E21B 47/06 |

FOREIGN PATENT DOCUMENTS

WO    2017105433 A1    6/2017

OTHER PUBLICATIONS

PCT/US2017/054894, "International Search Report and Written Opinion", dated Jun. 27, 2018, 23 pages.

* cited by examiner

*Primary Examiner* — Kristyn A Hall
(74) *Attorney, Agent, or Firm* — Kilpatrick Townsend & Stockton LLP

(57) ABSTRACT

A fracture network mapping system can include a sensor, a repeater, an acoustic signal generator, and a distributed acoustic sensing system. The sensor and the repeater can be positioned in a fracture of a well. The acoustic signal generator can be positioned in a wellbore of the well. The distributed acoustic sensing system can communicate location data of the sensor from the repeater and the acoustic signal generator to a processing device for mapping the fracture.

20 Claims, 10 Drawing Sheets

HYDRAULIC FRACTURING PROPPANT MIXTURE WITH SENSORS

TECHNICAL FIELD

The present disclosure relates to wellbore operations and equipment. More specifically, but not by way of limitation, this disclosure relates to a proppant mixture with sensors for hydraulic fracturing a wellbore and for fracture mapping.

BACKGROUND

Hydraulic fracturing can be performed in a well system, such as an oil or gas well, for extracting hydrocarbon fluids from a subterranean formation to increase the flow of the hydrocarbon fluids from the subterranean formation. Hydraulic fracturing can include pumping a treatment fluid that includes a proppant mixture into a wellbore formed through the subterranean formation. The treatment fluid can create fractures in the subterranean formation and the proppant mixture can occupy a portion of the fractures to prop the fractures open. Propping the fractures open can allow the hydrocarbon fluids to flow from the subterranean formation through the fractures and into the wellbore. Determining the locations of propped induced fractures can be difficult.

DETAILED DESCRIPTION

Figure 1:
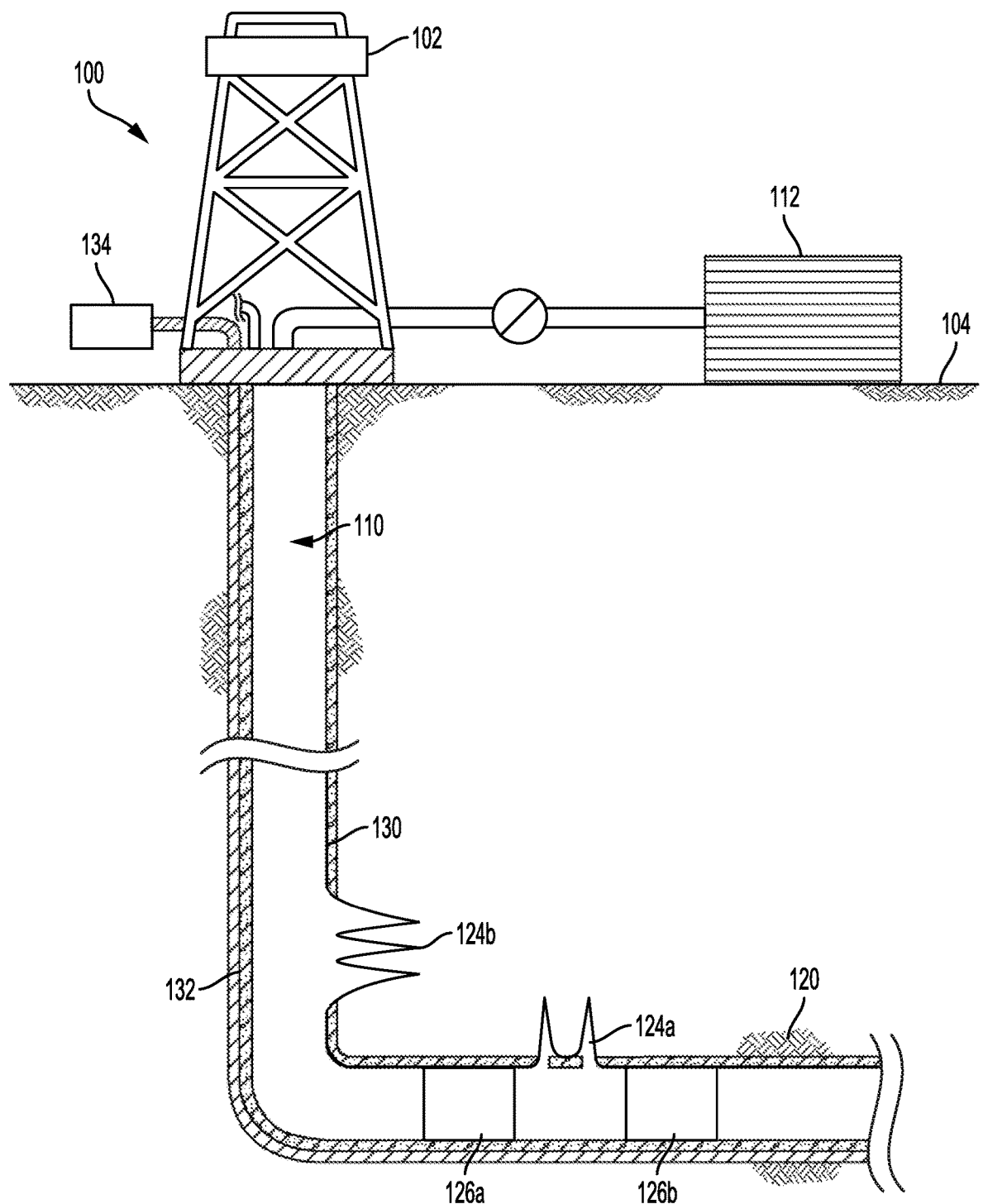
FIG. 1 is a diagram of an example of a well system in which a hydraulic fracturing proppant mixture with sensors can be used for fracture network mapping according to one aspect of the present disclosure.

Certain aspects and features relate to fracture network mapping using a hydraulic fracturing proppant mixture with sensors that can communicate with a distributed acoustic sensing ("DAS") system using an acoustic signal generator. The proppant mixture can be pumped into a fracture in a well during a hydraulic fracturing operation. The sensors can transmit a signal, which can be used to determine a location of the sensors in the fracture. The signal can be received by a repeater positioned in the fracture. In some examples, the repeater can be part of the proppant mixture pumped into the fracture. The repeater can transmit another signal representing the location of the sensor to an acoustic signal generator positioned in a wellbore of the well. The acoustic signal generator can transmit an acoustic signal representing the location of the sensor, which can be detected by a DAS system. The DAS system can provide data representing the location of the sensor to a processing device, which can map the fracture using the location of the sensor.

In some examples, the sensors can include unique individual identifiers or RFID tags, transceivers, and electronics to enable communication between individual sensors and repeaters. The repeaters can ping the sensors and the sensors can respond with unique identifiers. The repeaters can record the response time for the sensor and the response time recorded by multiple repeaters can be used to triangulate the location of the sensors. In additional or alternative examples, the sensors can include a transmitter periodically transmitting a signal with a unique identifier. The repeaters can record a strength or amplitude of the signal received from the sensor and the strength recorded by multiple repeaters can be used to triangulate the location of sensors. The recorded data may be communicated to a processing device that can determine the location of the sensors.

In some examples, the repeaters may be time synchronized and the relative positions of the repeaters can be mapped by the signals transmitted by the repeaters. A communication hub can be placed in a bridge plug or another device in the wellbore and can receive the signals from the repeaters. The communication hub can include an acoustic signal generator for transmitting an acoustic signal based on the signals received from the repeaters. The acoustic signal can interact with a fiber optic cable extending into the wellbore as part of a DAS system. The fiber optic cable can be interrogated by a fiber optic interrogation unit at the surface, which can communicate the location data for the repeaters and sensors to a processing device for mapping the fracture.

A fracture network mapping system using proppant mixture with sensors can enable substantially real-time characterization of fracture length and fracture complexity during a fracture operation. This information can be combined with DAS system and distributed temperature sensing ("DTS") system information to determine fluid placement, fracture initiation points, fluid volumes instantaneously and post fracture operation. Micro-seismic and micro-deformation or electromagnetic sensing data can be used to augment the decision process around controlling the fracture operation. Many of the decisions can be performed in real time or near real time to deliver timely information that can be used to control the fracturing operation. This information can enable real-time fracture operation optimization to generate a fracture network that can increase the production fluid output of the well. The information can also enable model development that can be used to enhance future fracture operations for wells without a fracture network mapping system. For example, data about the subterranean formation can be collected from multiple jobs and statistical control parameter sets can be derived and further calibrated by log data, cuttings information, and other local well data to generate models for future fracture operations.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

FIG. 1 is a diagram of an example of a well system 100 in which a proppant mixture with sensors can be used for fracture network mapping. The well system 100 includes a casing string 130 positioned in a wellbore 110 that has been formed in a surface 104 of the earth. The well system 100 may have been constructed and completed in any suitable manner, such as by use of a drilling assembly having a drill bit for creating the wellbore 110. The casing string 130 may include tubular casing sections connected by end-to-end couplings. In some aspects, the casing string 130 may be made of a suitable material such as steel. In some examples, the wellbore 110, cement may be injected and allowed to set between an outer surface of the casing string 130 and an inner surface of the wellbore 110

At the surface 104 of the wellbore 110, a tree assembly 102 may be joined to the casing string 130. The tree assembly 102 may include an assembly of valves, spools, fittings, etc. to direct and control the flow of fluid (e.g., oil, gas, water, etc.) into or out of the wellbore 110 within the casing string 130. For example a pump 112 can be coupled to the tree assembly 102 for injecting a treatment fluid into the wellbore 110 as part of a hydraulic fracturing operation. The treatment fluid can form the fractures 124a-b or perforations through the outer surface of the casing string 130, the cement, and a surrounding subterranean formation 120. The treatment fluid can include proppant for propping the fractures open such that production fluid can flow from the surrounding subterranean formation into the wellbore 110. The treatment fluid can further include sensors and repeaters that can be used to determine information about the fractures 124a-b and the subterranean formation 120. Bridge plugs can seal a portion of the wellbore 110 such that an interval below the top bridge plug is isolated to avoid pumping into existing fractures and so that new fractures can be created in the region above the top bridge plug. In this example, bridge plug 126b sealed a portion of the wellbore 110 to allow fractures 124a to form in the region closer to the wellhead than the bridge plug 126b. Bridge plug 126a sealed a portion of the wellbore 110 including fractures 124a to allow the fractures 124b to form in the region closer to the wellhead than the bridge plug 126a. In some aspects, a sensor in bridge plug 126b can be used to measure fluid leak-off into the formation assuming you already fractured the section between bridge plugs 126a and 126b.

Optical fibers 132 may be routed through one or more ports in the tree assembly 102 and extend along an outer surface of the casing string 130. The optical fibers 132 can include multiple optical fibers. For example, the optical fibers 132 can include one or more single-mode optical fibers and one or more multimode optical fibers. In some examples, the optical fibers 132 can be a sensing fiber that can measure an acoustic signal generated as the treatment fluid from the pump 112 passes through one of the fractures 124a-b. The optical fibers 132 may be retained against the outer surface of the casing string 130 at intervals by coupling bands that extend around the casing string 130. The optical fibers 132 may be retained by at least two of the coupling bands. In some aspects, the optical fibers 132 can be positioned exterior to the casing string 130, but other deployment options may also be implemented. For example, the optical fibers 132 can be coupled to a wireline or coiled tubing that can be positioned in an inner area of the casing string 130. The optical fibers 132 can be coupled to the wireline or coiled tubing such that the optical fibers 132 are removable with the wireline or coiled tubing.

The optical fibers 132 can be coupled to an interrogation subsystem 134 of a DAS. The interrogation subsystem 134 is positioned at the surface 104 of the wellbore 110. In some aspects, the interrogation subsystem 134 may be an optoelectronic unit that may include devices and components to interrogate the optical fibers 132. For example, the interrogation subsystem 134 may include an optical source, such as a laser device, that can generate optical signals to be transmitted through one or more of the optical fibers 132 in the wellbore 110. The interrogation subsystem 134 may also include an optical receiver to receive and perform interferometric measurements of backscattered optical signals from the optical fibers 132.

Although FIG. 1 depicts the optical fibers 132 as being a DAS optical fiber, each of the optical fibers 132 may include one or more optical sensors along the optical fibers 132. The sensors may be deployed in the wellbore 110 and used to sense and transmit measurements of downhole conditions in the well system 100 to the surface 104. The sensors or the optical fiber 132 can be remotely interrogated by transmitting an optical signal downhole through the optical fibers 132. In some examples, Rayleigh scattering from random variations of a refractive index in the optical waveguide can produce backscattered light. By measuring a difference in an optical phase of the scattering occurring at two locations along the optical fibers 132 and tracking changes in the phase difference over time, a virtual vibration sensor can be formed in the region between the two scattering location. By sampling the backscattered optical signals at a high rate (e.g., 100 MHz), the optical fibers 132 can be partitioned into an array of acoustic sensors.

Figure 2:
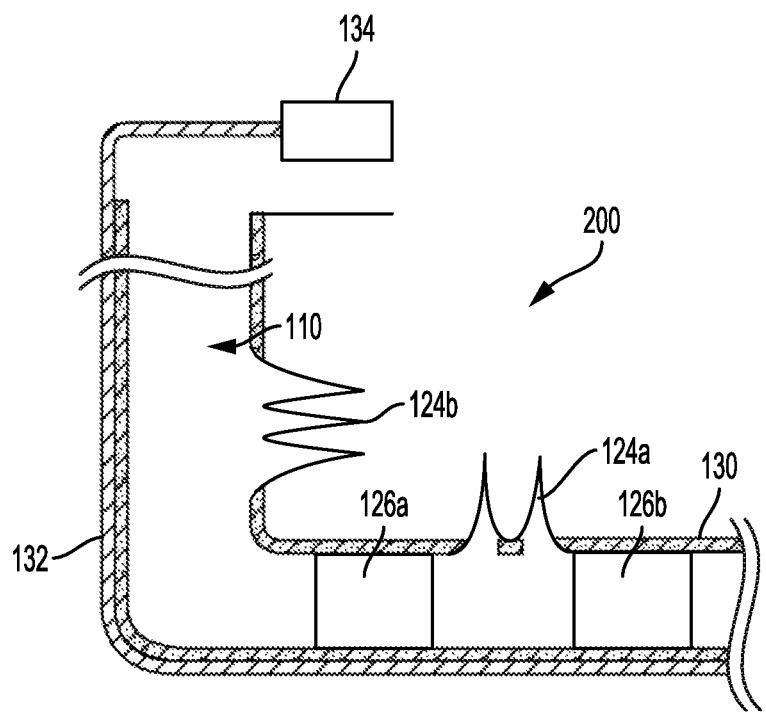
FIG. 2 is a schematic diagram of a fracture network mapping system in a wellbore environment according to one aspect of the present disclosure.

In some aspects, the bridge plugs 126a-b, optical fibers 132, and interrogation subsystem 134 can be communicatively coupled to sensors and repeaters positioned in the fractures 124a-b to form a fracture network mapping system. FIG. 2 is a schematic diagram of a fracture network mapping system 200. Although not depicted, the fracture network mapping system 200 can include sensors and repeaters positioned in the fractures 124a-b. Each of the sensors can transmit a signal representing location data for the sensor. One of the repeaters can receive the signal and transmit another signal representing the location data. The bridge plugs 126a-b can include components for receiving the signal from the repeater and communicating the location data for the sensors in the fractures 124a-b to the interrogation subsystem 134.

Figure 3:
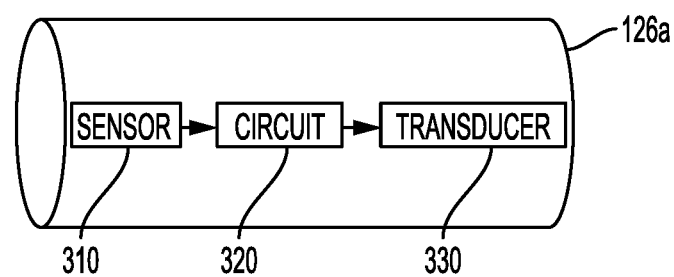
FIG. 3 is a block diagram of a bridge plug in a fracture network mapping system according to one aspect of the present disclosure.

FIG. 3 is a diagram of an example of the bridge plug 126a in the fracture network mapping system 200 of FIG. 2. The bridge plug 126a includes a sensor 310, a circuit 320, and a transducer 330. The sensor 310 can include any suitable device for communicating with the repeaters positioned in the fractures 124a-b. In some examples, the sensor 310 includes a radio frequency receiver for receiving wireless signals transmitted by the repeater. In additional or alternative examples, the sensor 310 can include a pressure sensor for detecting pressure waves or an acoustic sensor for detecting acoustic signals transmitted by the repeater. The circuit 320 is communicatively coupled to the sensor 310 and can include electronics for determining an acoustic signal based on the signal received from the repeater.

In some aspects, the circuit 320 includes a processing device for determining a location of the sensor in the fracture 124a-b based on the signal received from the repeater. In additional or alternative aspects, the processing device can determine the location of the sensor in the fracture 124a-b based on signals received by the sensor 310 from multiple receivers. For example, the circuit 320 can use triangulation to determine a location of the sensor in the fracture 124a-b by comparing a time for each of several repeaters to receive a signal from the sensor in the fracture 124a-b or by comparing a strength of a signal received by each of the repeaters from the sensor in the fracture 124a-b. The circuit 320 can determine an acoustic signal representing the location of the sensor in the fracture 124a-b and instruct the transducer 330 to transmit the acoustic signal.

Returning to FIG. 2, the interrogation subsystem 134 can detect the acoustic signal by transmitting an optical signal through the optical fibers 132 and measuring the backscattered light generated by the acoustic signal interacting with the optical signal. In some examples, the interrogation subsystem 134 includes a processing device for mapping the fractures 124 using location data for the sensors positioned in the fractures 124. In additional or alternative examples, a processing device for mapping the fractures 124 can be separate from, but communicatively coupled to, the interrogation subsystem 134. For example, a processing device can be included in a pump.

In some aspects, the well will be fractured by pumping a fracturing fluid and proppant mixture into the wellbore 110. The proppant mixture can include various sensors and repeaters such that the sensors and repeaters flow into the fracture 124. Various size repeaters may be used in the fracture fluid at various times to ensure a network of repeaters throughout the fracture 124. For example, smaller size repeaters may be deployed earlier in the fracturing operation and larger repeaters may be deployed later in the fracturing operation. The repeaters may activate sequentially and transmit or receive data sequentially, and the information may be used to track or triangulate the location of the sensors and other repeaters.

The repeaters can then communicate with a transceiver in the bridge plug 126 and the transceiver in the bridge plug 126 can acoustically transmit the information, which can be detected by the fiber optic sensing system interrogating the optical fiber 132. The acoustic information can be provided to a processing device and converted into relative position information between various repeaters and various sensors and this can be used to triangulate multiple sensors to build a 2D/3D model mapping the proppant placement in the formation. This can be repeated at various times during the fracturing operation or continuously measure/model the proppant placement and actively control the fracturing operation including diversion decisions, flow rates, pressures, and proppant concentration.

Figure 4:
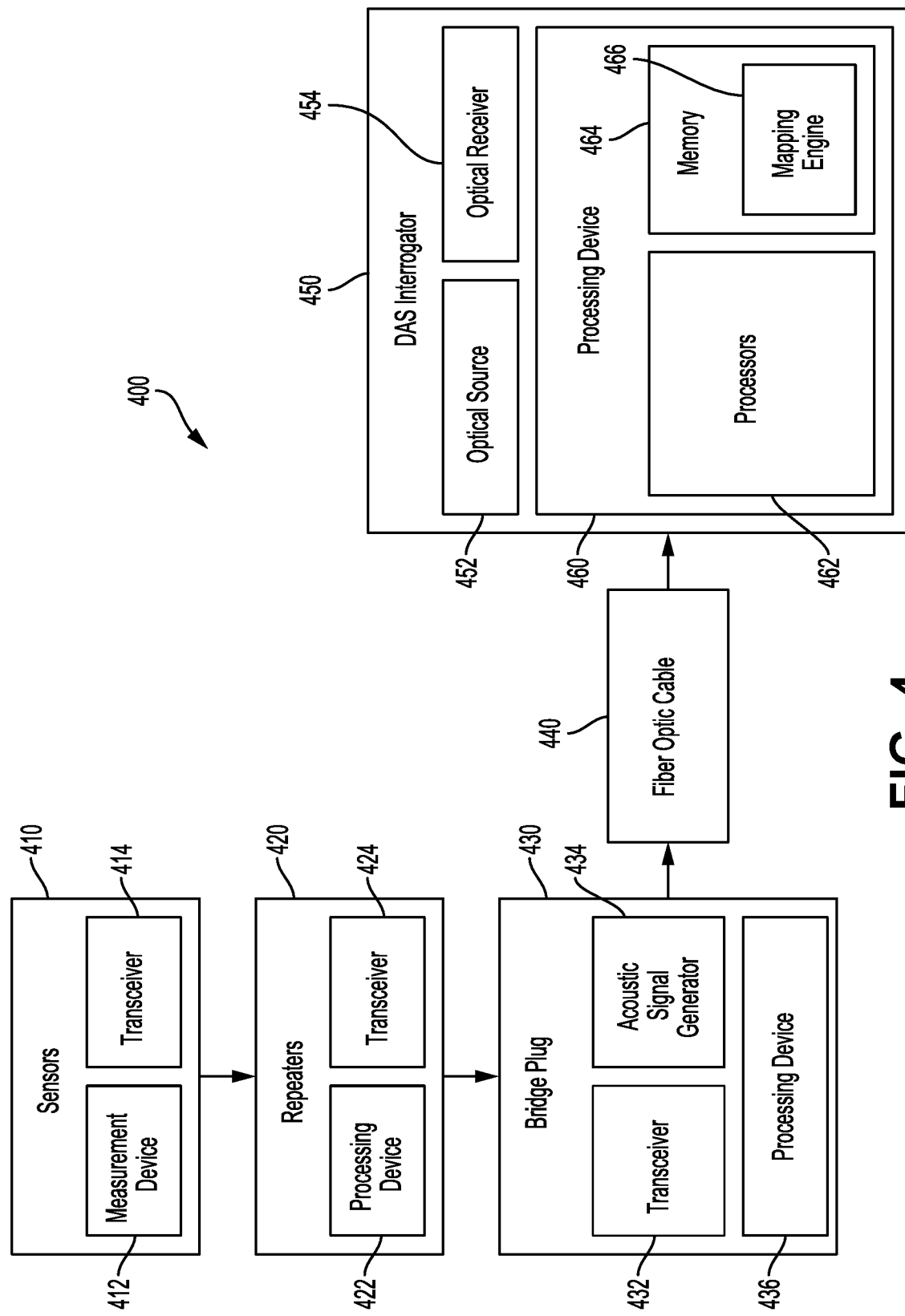
FIG. 4 is a block diagram of a fracture network mapping system according to one aspect of the present disclosure.

FIG. 4 is a block diagram of an example of a fracture network mapping system 400. The fracture network mapping system 400 includes sensors 410, repeaters 420, a bridge plug 430, a fiber optic cable 440, and a DAS interrogator 450.

The sensors 410 and the repeaters 420 can be positioned in a fracture in a well as part of a proppant mixture being pumped into the well during a fracturing operation. In this example, the sensors 410 include a measurement device 412 and a transceiver 414. The measurement device 412 can include a temperature sensor or a pressure sensor for measuring environmental conditions surrounding the sensors 410. The transceiver 414 can include a wireless transmitter for transmitting signals. The repeaters 420 can include a transceiver 424 that includes a wireless receiver for receiving the signals and a wireless transmitter for transmitting new signals based on the received signals. The repeaters 420 can also include a processing device 422 for determining the new signals based on the received signals. In some examples, the sensors 410 and repeaters 420 have unique identifiers. The unique identifiers can be included in signals transmitted by the sensors 410 and repeaters 420 such that the processing device 422 can associate the received signals to a specific device.

In some examples, the transceiver 414 includes a receiver and the transceiver 414 transmits a signal in response to receiving a request. In additional or alternative examples, the sensors 410 transmit a signal at predetermined intervals. The repeaters 420 can record a timing of the signals received from the sensors 410. The timing and strength of the received signals from a particular sensor 410 can be compared to triangulate a location of the sensor 410. In some aspects, the repeaters 420 can receive signals from other repeaters 420 and use the signals to identify a location of other repeaters 420 and the sensors 410.

In this example, the bridge plug 430 includes a transceiver 432 and an acoustic signal generator 434. The transceiver 432 can receive signals transmitted by the repeaters 420. In some examples, the transceiver 432 is a wireless transceiver for receiving radio frequency signals or pressure waves generated by the repeaters 420. The acoustic signal generator 434 generates acoustic signals that represent location data for the sensors 410 and repeaters 420 based on the signals received by the transceiver 432. In some examples, the bridge plug 430 can further include a circuit or a computing device for determining a location of the sensors 410 and repeaters 420.

The fiber optic cable 440 and the DAS interrogator 450 can form a DAS system for detecting the acoustic signal generated by the acoustic signal generator 434 and providing data representing a location of the sensors 410 to a processing device 460. In some examples, a DAS system can measure data about acoustic signals generated in the wellbore by the acoustic signal generator 434. In additional or alternative examples, a DAS system can measure data about acoustic signals generated by treatment fluid flowing through perforations into the fractures. A processing device can determine an expected total flow rate of the treatment fluid injected into the wellbore from the surface based on the measured data. Differences in the actual total flow rate of treatment fluid injected into the wellbore and the measured flow rate can indicate a screen-out has occurred.

In this example, the fiber optic cable 440 can include multiple optical fibers. In some examples, the fiber optic cable 440 can be a sensing fiber that can measure an acoustic signal generated by the acoustic signal generator 434 or as fluid passes through a perforation into a fracture. In this example, the DAS interrogator 450 includes an optical source 452, an optical receiver 454, and the processing device 460. The optical source 452 can include an optical transmitter such as a laser device, that can generate optical signals to be transmitted through the fiber optic cable 440. Backscattering of the optical signal can occur based on the optical signal interacting with the fiber optic cable 440 and can cause the optical signal to propagate back toward the optical receiver 454. In some examples, different backscattering can occur based on acoustic signals causing a vibration in the fiber optic cable 440. In additional or alternative examples, thermal signals (e.g., changes in temperature) can cause thermal expansion of the fiber optic cable 440 and movement or expansion of the fiber optic cable 440. The acoustic signals and the thermal signals may have different frequency content. The optical signal can be analyzed to determine real-time data about the acoustic signals including an intensity and location of the acoustic signal or changes in temperature. A DAS system can detect acoustic signals anywhere along a length of the fiber optic cable 440 in substantially real time (e.g., real time can be limited by the travel time of the optical pulse from the optical source 452 to the end of the fiber optic cable 440 and back to the optical receiver 454). For example, the DAS system can detect acoustic signals from the bridge plug 430 providing real-time data representing the location of the sensors 410 and repeaters 420 during a hydraulic fracturing process.

The processing device 460 can include any number of processors 462 configured for executing program code stored in memory 464. Examples of the processing device 460 can include a microprocessor, an application-specific integrated circuit ("ASIC"), a field-programmable gate array ("FPGA"), or other suitable processor. In some aspects, the processing device 460 can be a dedicated processing device used for mapping fractures based on location data of the sensors 410. In additional or alternative aspects, the processing device 460 can perform function in addition to mapping fractures. For example, the processing device 460 can determine a pumping schedule for a hydraulic fracturing process and communicate with a pump to perform the operation.

The processing device 460 can include (or be communicatively coupled with) a non-transitory computer-readable memory 464. The memory 464 can include one or more memory device that can store program instructions. The program instructions can include for example, a mapping engine 466 that is executable by the processing device 460 to perform certain operations described herein.

The operations can include determining a location of sensors 410, repeaters 420, and the bridge plug 430 in a wellbore. In some examples, the processing device 460 can determine the location of the sensors 410 relative to the repeaters 420 and the location of the repeaters 420 relative to the bridge plug 430. The processing device 460 can analyze the strength and timing of various signals received by different repeaters and the bridge plug to triangulate the location of the sensors 410 and the repeaters 420.

The operations can further include mapping a fracture based on the location of the sensors 410, repeaters 420, and the bridge plug 430. Mapping the fracture can include generating a mesh network that illustrates the distance between the sensors 410 and the repeaters 420, which can represent dimensions of the fracture. The processing device 460 can use additional information acquired by the DAS system such as the amount of treatment fluid flowing into the fracture to determine a volume of the fracture. The processing device can generate and update a model of the fracture in substantially real time during the fracturing operation and allow for real-time decisions to be made to improve the fracturing operation.

Although FIG. 4 depicts the processing device 460 as part of the DAS interrogator 450, other implementations are possible. In some example, the processing device 460 can be an independent device communicatively coupled to the DAS interrogator 450. In additional or alternative examples, the processing device can be included in another component such as a pump that pumps treatment fluid into the wellbore during a fracturing operation. The processing device 460 can instruct the pump to adjust the fracturing operation based on a map of the fractures generated by the processing device 460.

Figure 5:
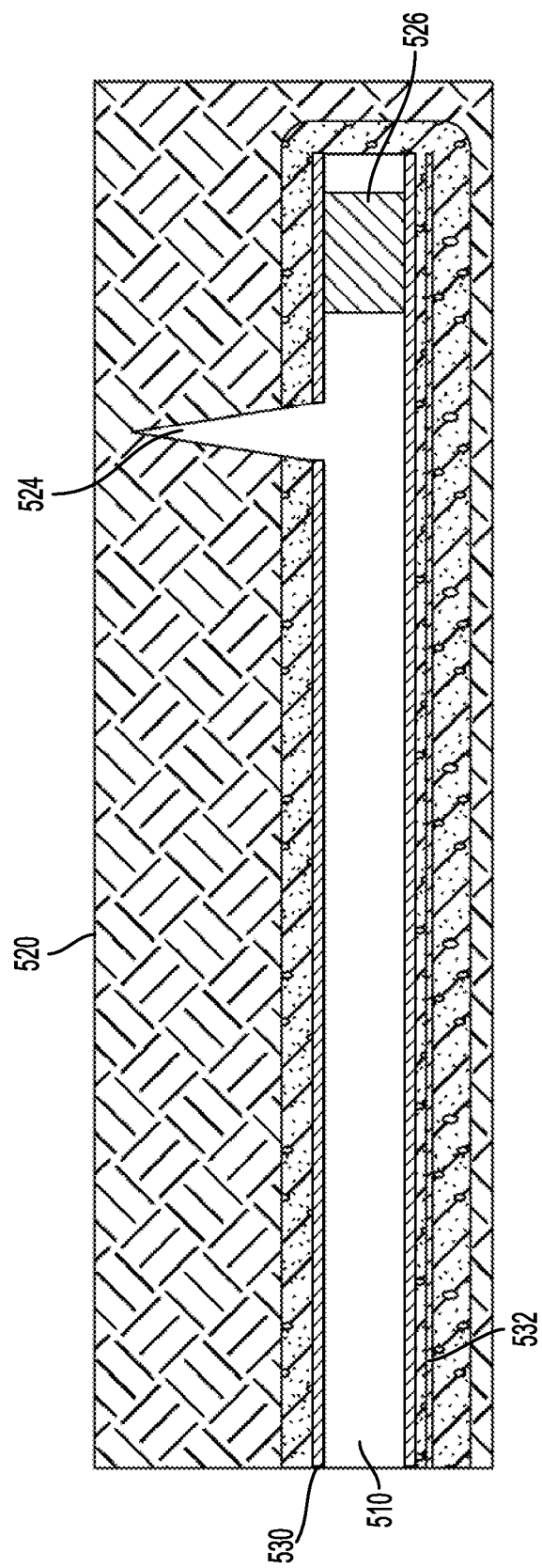
FIG. 5 is a cross-sectional diagram of a well system during a fracturing operation according to one aspect of the present disclosure.

FIGS. 5-10 depict cross-sectional diagrams of a well using a fracture network mapping system during a fracturing operation. A wellbore 510 is formed through a subterranean formation 520. The wellbore 510 is defined by a casing string 530 with a fiber optic cable 532 clamped to the outside of the casing string 530. The casing string 530 is cemented in place, and a bridge plug 526 is set to seal a portion of the wellbore 510. The bridge plug 526 can be an example of the bridge plug 430 in FIG. 4 and include components such as sensors, signal conditioning electronics, a battery, and one or more transponders. In FIG. 5, a fracture 524 has formed through the casing string 530 and the subterranean formation 520.

Figure 6:
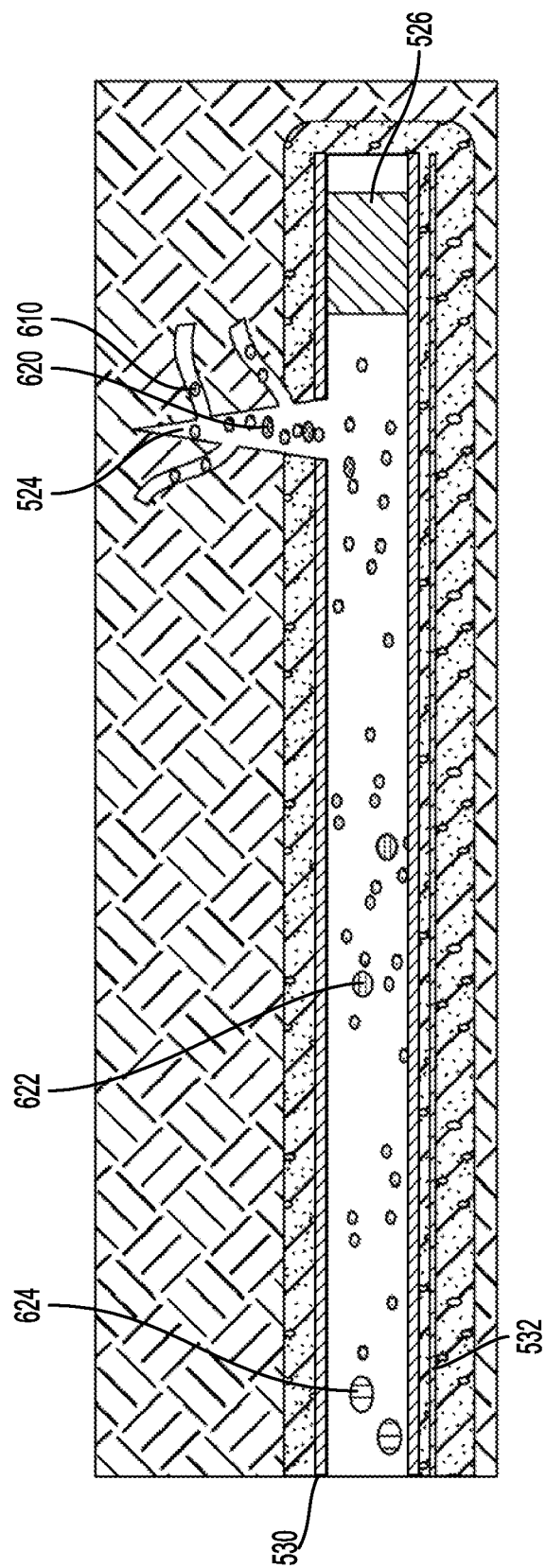
FIG. 6 is a cross-sectional diagram of the well system in FIG. 5 including treatment fluid with a proppant mixture that includes sensors and repeaters according to one aspect of the present disclosure.

In FIG. 6 treatment fluid including a proppant mixture has been pumped into the wellbore 510. In some examples, the fracture 524 has expanded in response to fluids and proppant being pumped downhole at elevated pressures. In this example, the proppant mixture includes sensors 610 and repeaters 620, 622, 624 each with unique identifiers. The repeaters 620, 622, 624 can include transceivers for communicating with the sensors 610 and the bridge plug 526. In some examples, one of the repeaters 620, 622, 624 can transmit a signal to one of the sensors 610 requesting a response from the sensor 610. The distance between the repeater 620, 622, 624 and the sensor can affect the time it takes for the repeater 620, 622, 624 to receive the response signal and affect the amplitude or strength of the response signal. The time it takes to receive a response and the strength of the response can be recorded by multiple repeaters 620, 622, 624 for multiple sensors 610. The unique identifier for each of the sensors 610 can allow for the data for a sensor 610 recorded by multiple repeaters 620, 622, 624 to be compared to determine a location of the sensor 610. The location of the sensors can be communicated to the bridge plug 526 by the repeaters 620, 622, 624. For example, the repeaters 620, 622, 624 can transmit a modulated pressure wave, acoustic signal, or radio frequency signal that can be received by the bridge plug 526.

The bridge plug can include an acoustic signal generator for acoustically transmitting acoustic signals that can change optical properties in the optical fiber in the fiber optic cable 532. The change in optical properties may be detected by an optical interrogator that can be communicatively coupled to a processing device. In some examples, the bridge plug 526 can determine the location of the sensors 610 and the repeaters 620, 622, 624 and communicate the location data to the processing device by transmitting an acoustic signal modulated to include the location data. In additional or alternative examples, the bridge plug 526 can transmit an acoustic signal modulate to include the data recorded by the repeaters 620, 622, 624 (e.g., times to receive a response from the sensors 610 and strengths of the responses).

Figure 7:
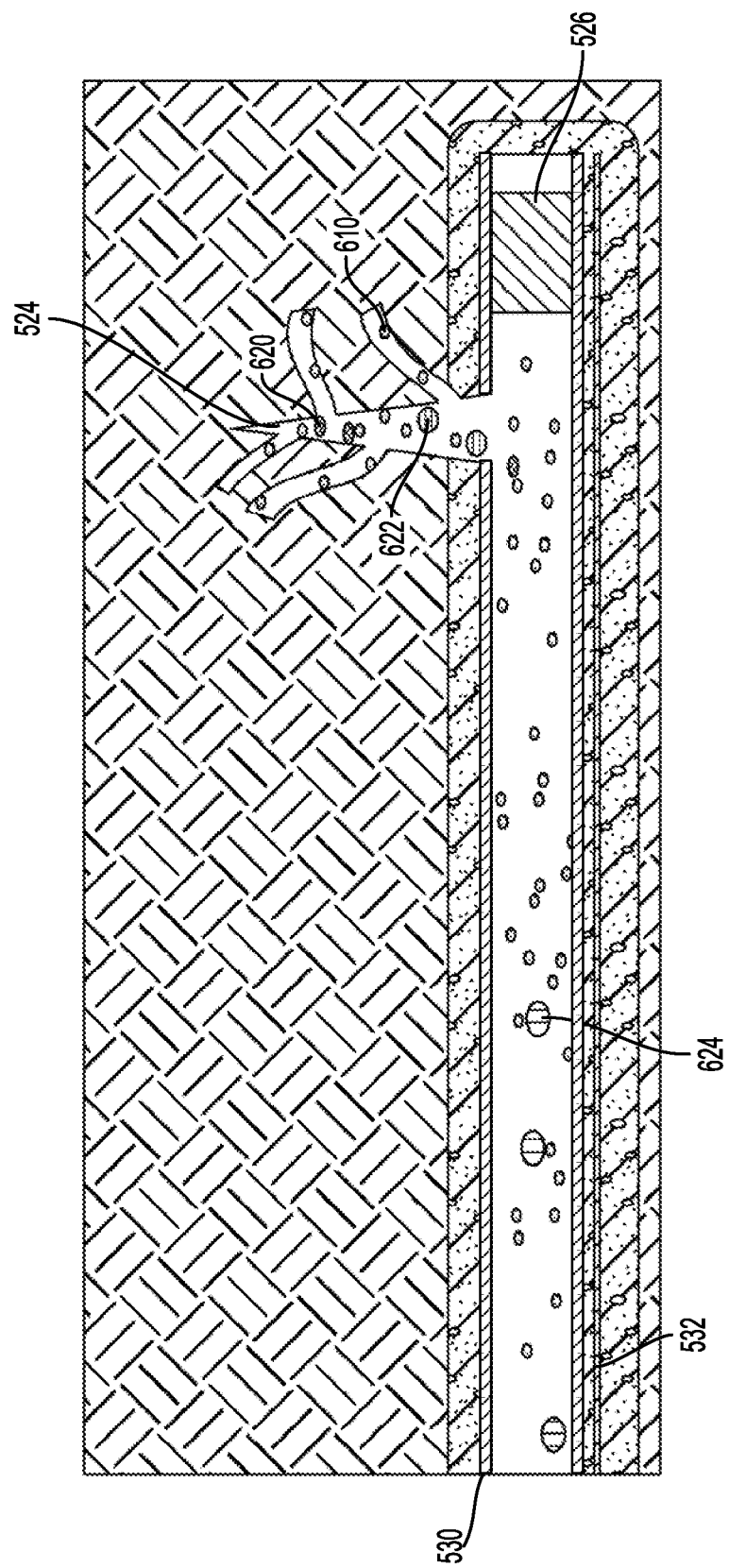
FIG. 7 is a cross-sectional diagram of the well system in FIG. 6 with an expanded fracture according to one aspect of the present disclosure.
Figure 8:
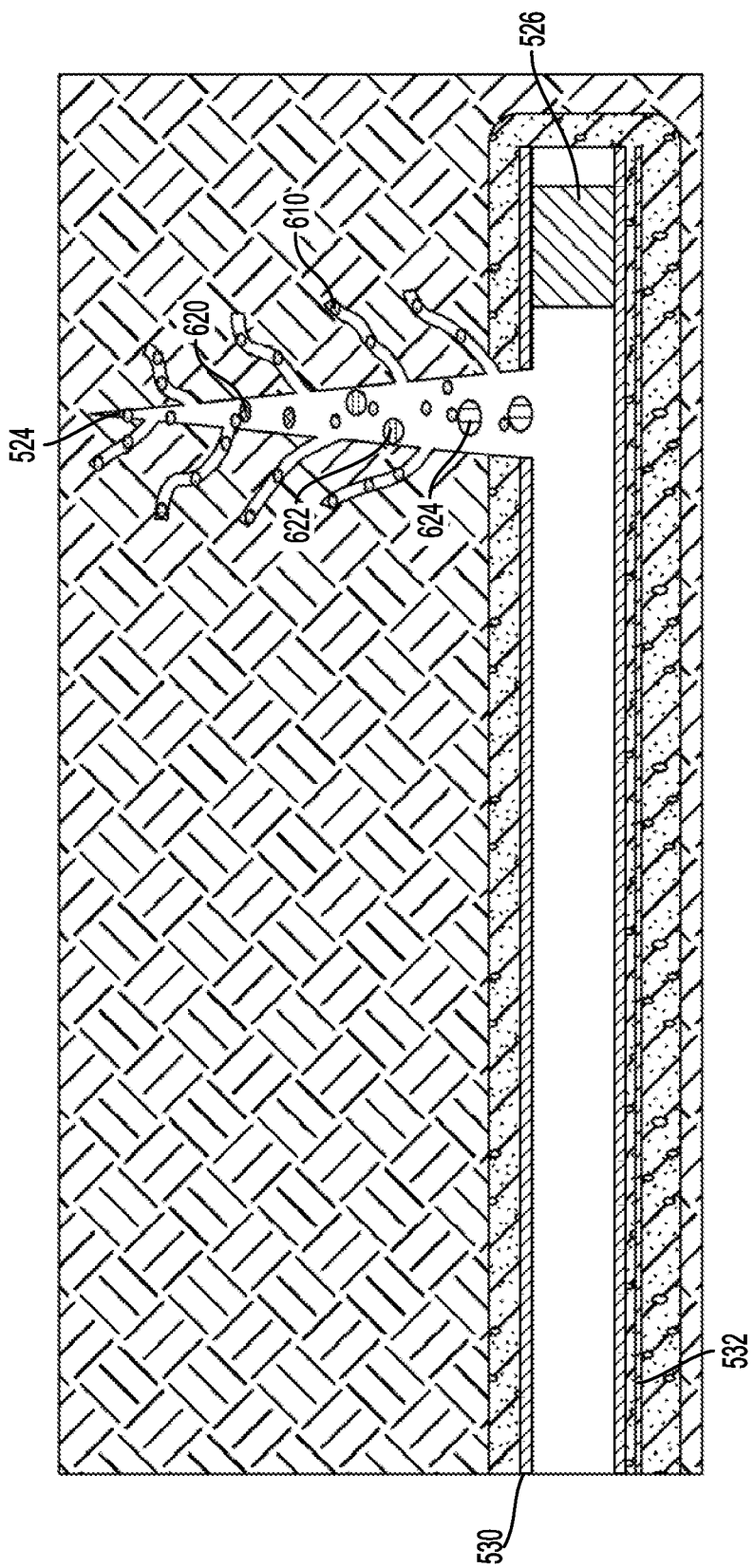
FIG. 8 is a cross-sectional diagram of the well system in FIG. 7 with a fully expanded and propped fracture according to one aspect of the present disclosure.
Figure 9:
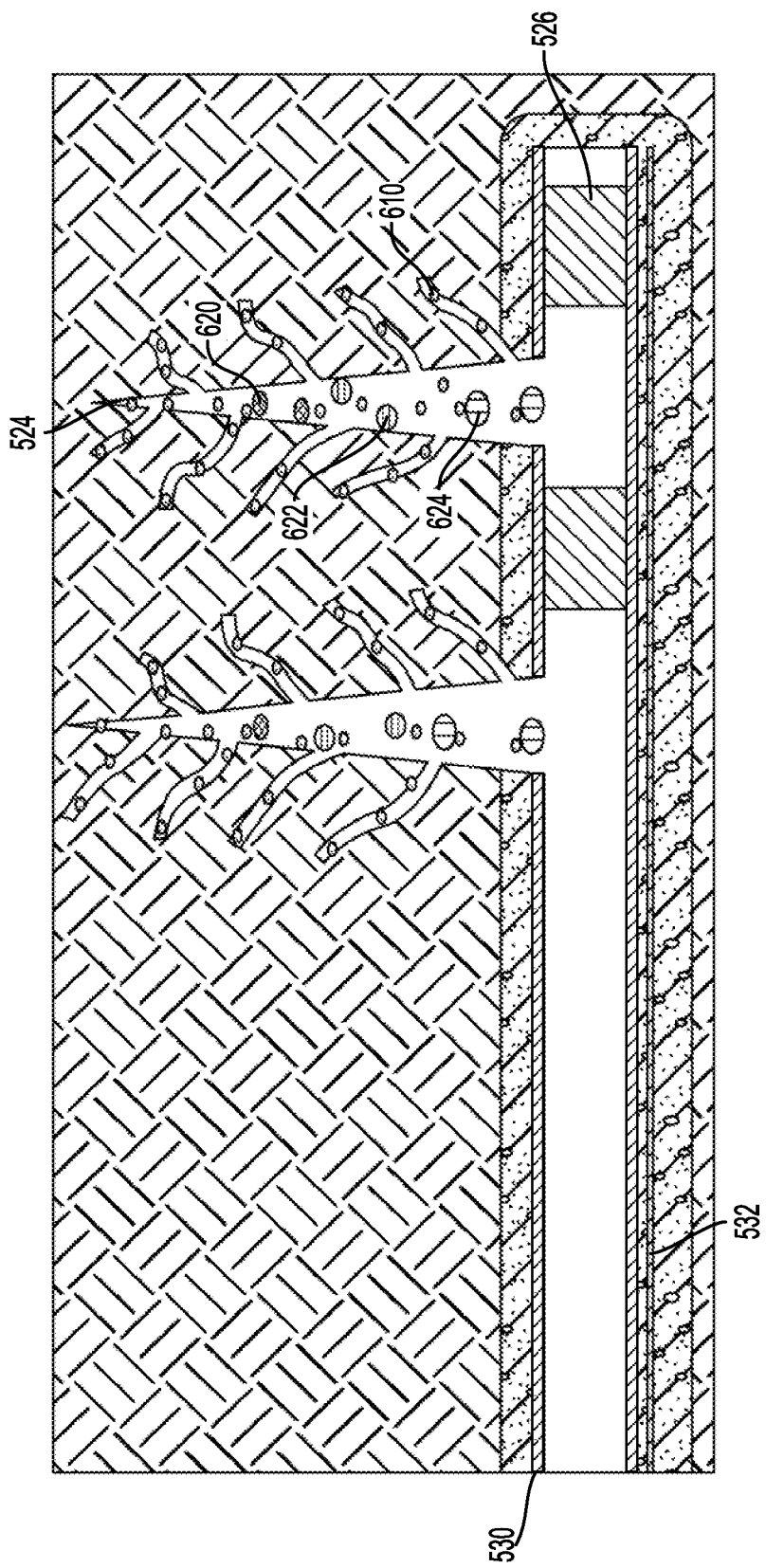
FIG. 9 is a cross-sectional diagram of the well system in FIG. 8 with two fully expanded and propped fractures according to one aspect of the present disclosure.

In this example, the size of the repeaters 620, 622, 624 is varied such that initially repeaters 620 having substantially the same size as the proppant is pumped into the wellbore 510. Over time, larger repeaters 622, 624 are pumped into the wellbore 510. As is depicted in FIGS. 7-9, the larger repeaters 622, 624 are prevented from traveling as deep into the fracture 524 as the smallest repeaters 620. The variation in size of the repeaters 620, 622, 624 can form a repeater network for communicating between the sensors 610 and the bridge plug 526.

In FIG. 7, the fracture 524 is further expanded and the repeaters 620 and repeaters 622 are both positioned in the fracture 524. In FIG. 8, the fracture 524 is further expanded and the repeaters 620, repeaters 622, and repeaters 624 are positioned in the fracture 524. The varying size of the repeaters 620, 622, 624 affect the position of the repeaters 620, 622, 624 within the fracture 524 and create a repeater network that maintains a communication path between the bridge plug 526 and sensors 610 positioned throughout the fracture 524.

Figure 10:
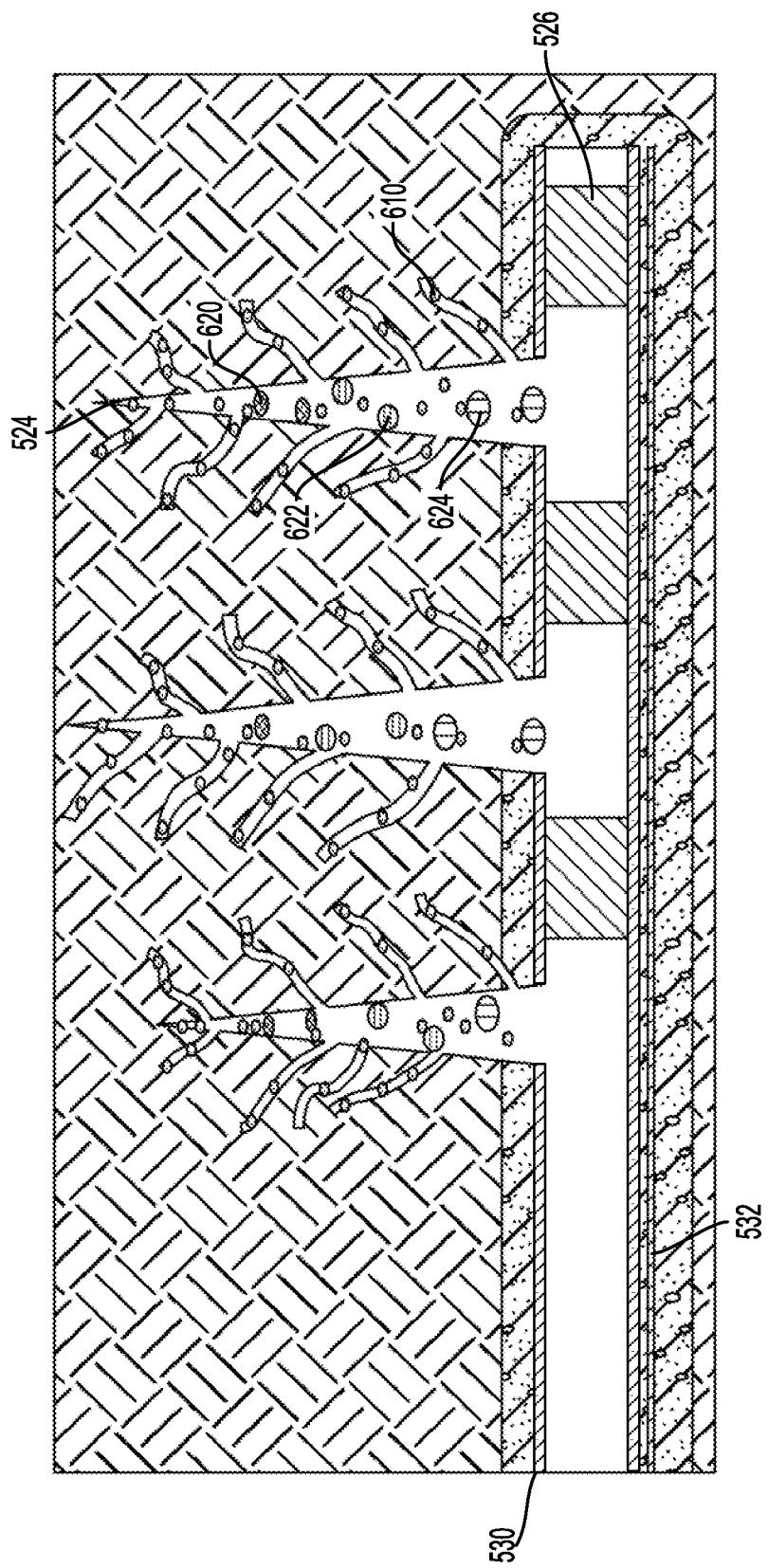
FIG. 10 is a cross-sectional diagram of the well system in FIG. 8 with three fully expanded and propped fractures according to one aspect of the present disclosure.

In FIGS. 9-10, the fracturing operation has been repeated by setting a new bridge plug in the wellbore above the previously formed fracture 524 to isolate these fractures 524 from subsequent treatments In some aspects, adding bridge plugs 526 after each treatment can allow a long interval in a horizontal well to be treated in smaller intervals. Although each fracture 524 is depicted as a single fracture network, each fracture 524 can include multiple fracture networks. In some aspects, the fracture network mapping system can be used to determine the number of sensors 610 and repeaters 620, 622, 624 that are entering each perforation and can provide substantially instantaneous and cumulative flow estimates into each of the perforations. The sensors 610 and repeaters 620, 622, 624 can have a substantially constant spacing while flowing in the casing string 530 and the spacing can change as the sensors 610 and repeaters 620, 622, 624 flow into a perforation. For example, spacing can increase between some sensors 610 and repeaters 620, 622, 624 as some flow into one perforation and some flow into another. This information can be used to constrain models of the fractures 524 and the subterranean formation 520. In some examples, the information can be used to better predict fracture properties including length and evolution over time. This information when coupled with knowledge about a subterranean formation can be used to predict the statistically probably fracture network growth and size. Information representing the fluid flow distribution can be used to make real-time decisions on diversion implementation including a timing of diverter release, a type of diverter, and an amount of diverter. The distance between sensors 610 repeaters 622, 624, 626, and the bridge plug 526 can be converted into a mesh network such that an image and representation of the propped fractures 524 can be achieved.

The bridge plugs 526 can remain in the wellbore throughout the treatment process and monitor the sensors 610 and repeaters 622, 624, 626. In some aspects, the bridge plugs 526 can be removed after the treatment process is completed to open the wellbore 510 for production. In some examples, the bridge plugs 526 can be made of degradable material that can dissolve after the treatment process is completed. In additional or alternative examples, the bridge plugs 526 can be mechanically drilled out to open the wellbore 510 for production.

Figure 11:
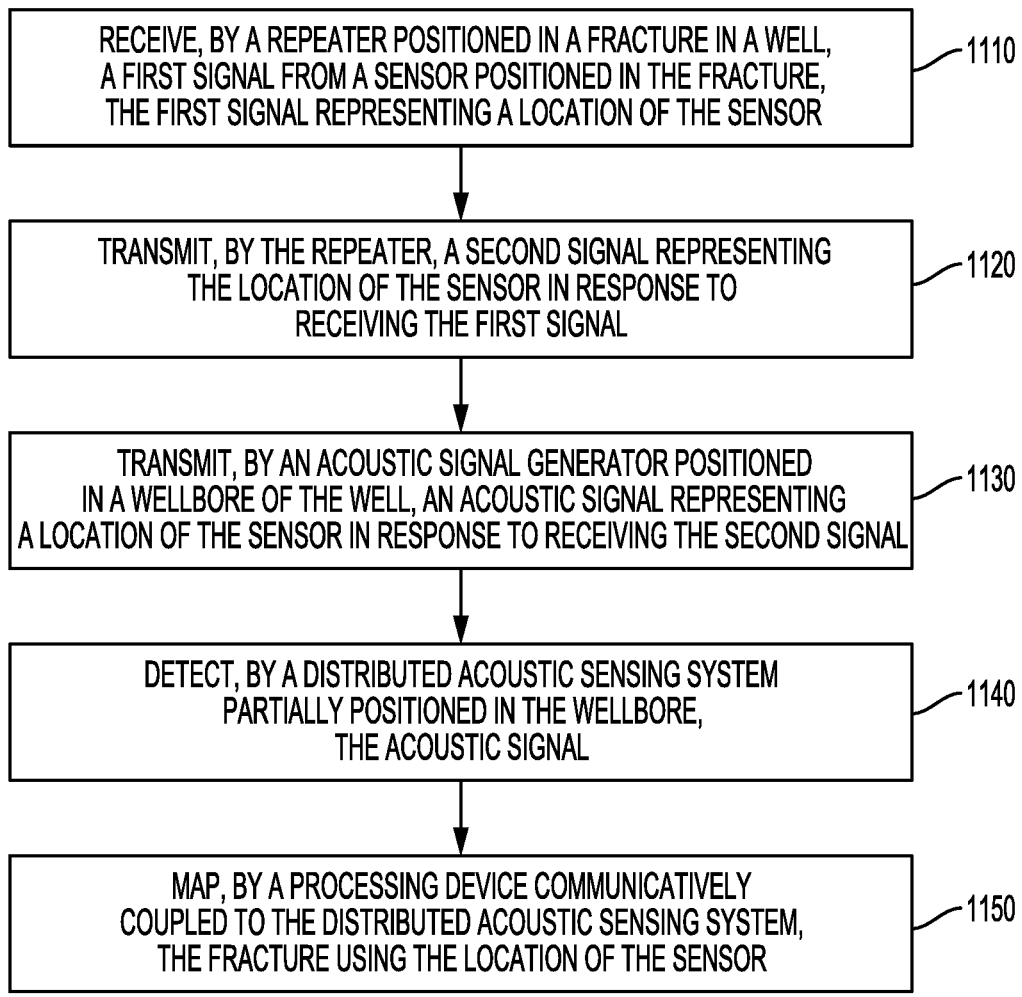
FIG. 11 is a flowchart of a process for using hydraulic fracturing proppant mixture with sensors to map a fracture network according to one aspect of the present disclosure.

FIG. 11 is a flowchart of a process for fracture network mapping using proppant mixture with sensors according to one aspect of the present disclosure.

In block 1110, a repeater positioned in a fracture in a well receives a first signal from a sensor positioned in the fracture, the first signal representing a location of the sensor. In some examples, the sensor and the repeater are positioned in the fracture as part of a proppant mixture during a fracturing operation. The repeater can include a transceiver to transmitting a wireless request signal to the sensor.

The sensor can include a transceiver for transmitting the first signal in response to receiving the wireless request signal. In additional or alternative examples, the sensor can include a measurement device for measuring characteristics about a subterranean formation through which the fracture is formed. For example, the sensor can include a temperature sensor, a pressure sensor, or an electromagnetic field sensor. The sensor can also include a unique identifier and can transmit the first signal including data representing the unique identifier and the measured characteristics.

In block 1120, the repeater transmits a second signal representing the location of the sensor in response to receiving the first signal. In some examples, the repeater retransmits the same signal received from the sensor. In additional or alternative examples, the repeater can include a processing device for extracting information from the first signal. The repeater can determine a strength or an amplitude of the first signal or a time between the repeater requesting the first signal and receiving the first signal. In some aspects, the repeater can include a memory device and can store data extracted from more than one signal received from the sensor or from multiple sensors. The second signal can be modulated to include the data extracted from the first signal or several signals. The second signal can be any suitable signal including a pressure wave, an acoustic signal, or a radio frequency signal.

In block 1130, an acoustic signal generator positioned in a wellbore of the well transmits an acoustic signal representing a location of the sensor in the response to receiving the second signal. In some aspects, the acoustic signal generator can be included in or coupled to a bridge plug positioned in the wellbore for sealing a portion of the wellbore during the fracturing operation. The acoustic signal generator can be communicatively coupled to a transceiver for receiving the second signal from the repeater. In some examples, the acoustic signal generator transmits an acoustic signal version of the second signal. In additional or alternative examples, the acoustic signal generator is communicatively coupled to circuitry or a processing device for determining the location of the sensor and the repeater based on the second signal. The location of the sensor and the repeater can be based on a strength of the second signal and a time between receiving signals from the repeater. In some examples, the repeater has a unique identifier and transmits updates to the acoustic signal generator at periodic intervals. A processing device communicatively coupled to the acoustic signal generator can monitor changes in the timing and strength of the signals received from the repeater in order to determine a location of the repeater. The processing device can extract information from the signals to determine a location of one or more sensors in relation to the location of the repeater. The acoustic signal generator can transmit an acoustic signal modulated to include data representing the location of the sensors.

In block 1140, a DAS system partially positioned in the wellbore detects the acoustic signal. In some examples the DAS system can include an optical source, an optical receiver, and an optical fiber. The optical source can transmit an optical signal downhole through the optical fiber, which can extend into the wellbore. The optical receiver can receive a backscattered optical signal formed based on the optical signal responding to the acoustic signal. The optical receiver can be communicatively coupled to a processing device and can transmit a signal to the processing device representing a location of the sensor. In some examples, the DAS system can include a processing device for determining the location of the sensor and the repeater from the received backscattered optical signal. In additional or alternative examples, the DAS system can transmit an electrical signal version of the backscattered optical signal to the processing device.

In block 1150, a processing device communicatively coupled to the DAS system maps the fracture using the location of the sensor. The processing device can determine the location of the sensor in substantially real time during a fracturing operation. The location of the sensor can indicate a data point for mapping the fracture. Using the relative location of several sensors and repeaters positioned in a fracture the processing device can form a mesh network that illustrates an inner area of the fracture. In some aspects, the processing device can use additional information acquired by the fracture network mapping system including an amount of treatment fluid flowing through a perforation and substantially real-time detection of screen-outs. The processing device can use the information to create a real-time model of the fracture and adjust the fracturing operation to adjust the size and shape of the fracture. Adjusting the size and shape of the fracture can increase the flow of production fluid through the fracture and into the wellbore.

In some aspects, proppant mixture with sensors for hydraulic fracturing a wellbore and for fracture mapping is provided according to one or more of the following examples:

Example #1

A fracture network mapping system including a sensor, a repeater, an acoustic signal generator, and a distributed acoustic sensing system. The sensor positioned in a fracture of a well. The repeater positioned in the fracture. The acoustic signal generator positioned in a wellbore of the well. The distributed acoustic sensing system for communicating location data of the sensor from the repeater and the acoustic signal generator to a processing device for mapping the fracture.

Example #2

The fracture network mapping system of Example #1, further featuring the sensor including a measurement device and a wireless transmitter. The measurement device for determining a characteristic of a subterranean formation through which the fracture is formed. The wireless transmitter for wirelessly transmitting a signal representing the characteristic and a location of the sensor in the fracture.

Example #3

The fracture network mapping system of any of Examples #1-2, further featuring the repeater including a wireless receiver and a wireless transmitter. The wireless receiver for wirelessly receiving a first signal from the sensor. The first signal representing a location of the sensor in the fracture. The wireless transmitter for wirelessly transmitting a second signal based on the first signal.

Example #4

The fracture network mapping system of any of Examples #1-3, further featuring a bridge plug. The bridge plug including a wireless receiver and the acoustic signal generator. The wireless receiver for wirelessly receiving a wireless signal from the repeater. The wireless signal representing the location data of the sensor. The acoustic signal generator for transmitting an acoustic signal representing the location data.

Example #5

The fracture network mapping system of any of Examples #1-4, further featuring the bridge plug being a first bridge plug of a plurality of bridge plugs positioned in the wellbore. The plurality of bridge plugs can be used for monitoring a plurality of fractures that include the fracture. The first bridge plug can further comprise a computing device communicatively coupled to the wireless receiver and the acoustic signal generator for determining the location data based on a strength of a sensor signal generated by the sensor or a time taken for the repeater to receive the sensor signal in response to transmitting a request signal.

Example #6

The fracture network mapping system of any of Examples #1-5, further featuring the distributed acoustic sensing system including an optical fiber, an optical source, and an optical receiver. The optical fiber can be extended downhole. The optical source can transmit an optical signal downhole through the optical fiber. The optical receiver can receive a backscattered optical signal formed based on the optical signal responding to an acoustic signal generated by the acoustic signal generator and can provide the location data to the processing device. The location data being can be used by the processing device to determine instructions for a pump to adjust a fracturing operation.

Example #7

The fracture network mapping system of any of Examples #1-6, further featuring the sensor and the repeater being positioned in the fracture as part of a proppant mixture. The repeater can transmit a request to the sensor. The sensor can have a unique identity and can be positioned in the fracture for transmitting a first signal representing the unique identity in response to receiving the request. The repeater can be further positioned in the fracture for receiving the first signal. The fracture network mapping system can further include a processing device for calculating a time between the repeater transmitting the request and the repeater receiving the first signal and for using the time to determine a location of the sensor in the fracture.

Example #8

A method including receiving, by a repeater positioned in a fracture in a well, a first signal from a sensor positioned in the fracture. The first signal representing a location of the sensor. The method further including transmitting, by the repeater, a second signal representing the location of the sensor in response to receiving the first signal. The method further including receiving, by an acoustic signal generator positioned in a wellbore of the well, the second signal. The method further including transmitting, by the acoustic signal generator, an acoustic signal representing the location of the sensor in response to receiving the second signal. The method further including detecting, by a distributed acoustic sensing system positioned at least partially in the wellbore, the acoustic signal. The method further including mapping, by a processing device communicatively coupled to the distributed acoustic sensing system, the fracture using the location of the sensor.

Example #9

The method of Example #8, further featuring receiving the first signal including transmitting, by the repeater, a request signal. Receiving the first signal further including transmitting, by the sensor, the first signal in response to receiving the request signal.

Example #10

The method of Example #9, further featuring measuring, by the sensor, a characteristic of a subterranean formation through which the fracture is formed. The first signal representing the characteristic. Mapping the fracture being further based on the characteristic.

Example #11

The method of any of Examples #9-10, further featuring transmitting the second signal including determining, by the repeater, the location of the sensor based on a time between the repeater transmitting the request signal and the repeater receiving the first signal.

Example #12

The method of any of Examples #8-11, further featuring transmitting the second signal including determining, by the repeater, the location of the sensor based on a strength of the first signal received.

Example #13

The method of any of Examples #8-12, further featuring detecting the acoustic signal including transmitting, by an optical source, an optical signal downhole through an optical fiber. Detecting the acoustic signal further including receiving, by an optical receiver, backscattered optical signal formed based on the optical signal responding to the acoustic signal. Detecting the acoustic signal further including providing, by the optical receiver, the location of the sensor to the processing device. Mapping the fracture including generating a model of the fracture. The method further including transmitting instructions to a pumping system to adjust a fracturing operation. The instructions determined by analyzing the model of the fracture.

Example #14

The method of any of Examples #8-13, further featuring receiving the first signal including receiving a first wireless signal from the sensor. Transmitting the second signal can include transmitting a second wireless signal. The sensor and the repeater can be positioned in the fracture as part of a proppant mixture.

Example #15

A proppant mixture can include a sensor and a repeater. The proppant mixture can be positioned in a fracture in a well for wirelessly communicating with an acoustic signal generator in a wellbore of the well to acoustically transmit information about the sensor for receipt by a distributed acoustic sensing system at least partially in the wellbore.

Example #16

The proppant mixture of Example #15, further featuring the sensor including a measurement device and a wireless transmitter. The measurement device can determine a characteristic of a subterranean formation through which the fracture is formed. The wireless transmitter can wirelessly transmit a signal representing the characteristic and a location of the sensor in the fracture.

Example #17

The proppant mixture of any of Examples #15-16, further featuring the repeater including a wireless receiver and a wireless transmitter. The wireless receiver can wirelessly receive a first signal from the sensor, the first signal representing a location of the sensor in the fracture. The wireless transmitter can wirelessly transmit a second signal based on the first signal.

Example #18

The proppant mixture of Example #17, further featuring the repeater including a computing device communicatively coupled to the wireless receiver that can determine a location of the sensor based on a strength of the first signal. The repeater can be communicatively coupled to the wireless transmitter for causing the second signal to represent the location of the sensor.

Example #19

The proppant mixture of any of Examples #17-18, further featuring the wireless transmitter can be operated to transmit a request signal. The sensor can be operated to transmit the first signal in response to the sensor receiving the request signal. The repeater can further include a processing device communicatively coupled to the wireless receiver that can determine a time between the repeater transmitting the request signal and the wireless transmitter receiving the first signal. The processing device can further determine a location of the sensor based on the time. The processing device can be communicatively coupled to the wireless transmitter for causing the second signal to represent the location of the sensor.

Example #20

The proppant mixture of any of Examples #15-19, further featuring the sensor being a first sensor of multiple sensors and the repeater being a first repeater of multiple repeaters, the multiple repeaters including repeaters of more than one size, smaller repeaters can be positioned farther from the wellbore than larger repeaters and can create a communication network for communicating location data for each sensor to the acoustic signal generator. The location data can be used for mapping the fracture and adjusting a fracturing operation.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:
1. A fracture network mapping system comprising:
a sensor positionable in a fracture of a well;
a repeater positionable in the fracture;
an acoustic signal generator positionable in a wellbore of the well;

a distributed acoustic sensing system for communicating location data of the sensor from the repeater and the acoustic signal generator to a processing device for mapping the fracture; and a bridge plug comprising:
  a wireless receiver for wirelessly receiving a wireless signal from the repeater, the wireless signal representing the location data of the sensor; and
  the acoustic signal generator for transmitting an acoustic signal representing the location data.

2. The fracture network mapping system of claim 1, wherein the sensor comprises:
  a measurement device for determining a characteristic of a subterranean formation through which the fracture is formed; and
  a wireless transmitter for wirelessly transmitting a signal representing the characteristic and a location of the sensor in the fracture.

3. The fracture network mapping system of claim 1, wherein the repeater comprises:
  a wireless receiver for wirelessly receiving a first signal from the sensor, the first signal representing a location of the sensor in the fracture; and
  a wireless transmitter for wirelessly transmitting a second signal based on the first signal.

4. The fracture network mapping system of claim 1, wherein the bridge plug is a first bridge plug of a plurality of bridge plugs positioned in the wellbore, the plurality of bridge plugs usable for monitoring a plurality of fractures that include the fracture, the first bridge plug further comprising a computing device communicatively coupled to the wireless receiver and the acoustic signal generator for determining the location data based on a strength of a sensor signal generated by the sensor or a time taken for the repeater to receive the sensor signal in response to transmitting a request signal.

5. The fracture network mapping system of claim 1, wherein the distributed acoustic sensing system comprises:
  an optical fiber extendable downhole;
  an optical source for transmitting an optical signal downhole through the optical fiber; and
  an optical receiver for receiving a backscattered optical signal formed based on the optical signal responding to an acoustic signal generatable by the acoustic signal generator and providing the location data to the processing device, the location data being usable by the processing device to determine instructions for a pump to adjust a fracturing operation.

6. The fracture network mapping system of claim 1, wherein the sensor and the repeater are positionable in the fracture as part of a proppant mixture, the repeater for transmitting a request to the sensor, the sensor having a unique identity and being positionable in the fracture for transmitting a first signal representing the unique identity in response to receiving the request, the repeater being further positionable in the fracture for receiving the first signal, the fracture network mapping system further comprising a processing device for calculating a time between the repeater transmitting the request and the repeater receiving the first signal and for using the time to determine a location of the sensor in the fracture.

7. The fracture network mapping system of claim 1, wherein the sensor is a first sensor of a plurality of sensors and the repeater is a first repeater of a plurality of repeaters, the plurality of repeaters including repeaters of more than one size, smaller repeaters of the plurality of repeaters being positionable farther from the wellbore than larger repeaters of the plurality of repeaters for creating a communication network for communicating location data for each sensor of the plurality of sensors to the acoustic signal generator, the location data being usable for mapping the fracture and adjusting a fracturing operation.

8. A method comprising:
  receiving, by a repeater positioned in a fracture in a well, a first signal from a sensor positioned in the fracture, the first signal representing a location of the sensor;
  transmitting, by the repeater, a second signal representing the location of the sensor in response to receiving the first signal;
  receiving, by an acoustic signal generator positioned in a wellbore of the well, the second signal;
  transmitting, by the acoustic signal generator, an acoustic signal representing the location of the sensor in response to receiving the second signal;
  detecting, by a distributed acoustic sensing system positioned at least partially in the wellbore, the acoustic signal; and
  mapping, by a processing device communicatively coupled to the distributed acoustic sensing system, the fracture using the location of the sensor.

9. The method of claim 8, wherein receiving the first signal comprises:
  transmitting, by the repeater, a request signal; and
  transmitting, by the sensor, the first signal in response to receiving the request signal.

10. The method of claim 9, further comprising measuring, by the sensor, a characteristic of a subterranean formation through which the fracture is formed, the first signal representing the characteristic, wherein mapping the fracture is further based on the characteristic.

11. The method of claim 9, wherein transmitting the second signal comprises determining, by the repeater, the location of the sensor based on a time between the repeater transmitting the request signal and the repeater receiving the first signal.

12. The method of claim 8, wherein transmitting the second signal comprises determining, by the repeater, the location of the sensor based on a strength of the first signal received.

13. The method of claim 8, wherein detecting the acoustic signal comprises:
  transmitting, by an optical source, an optical signal downhole through an optical fiber;
  receiving, by an optical receiver, backscattered optical signal formed based on the optical signal responding to the acoustic signal; and
  providing, by the optical receiver, the location of the sensor to the processing device,
  wherein mapping the fracture comprises generating a model of the fracture,
  wherein the method further comprises transmitting instructions to a pumping system to adjust a fracturing operation, the instructions determined by analyzing the model of the fracture.

14. The method of claim 8, wherein receiving the first signal comprises receiving a first wireless signal from the sensor, wherein transmitting the second signal comprises transmitting a second wireless signal, the sensor and the repeater positioned in the fracture as part of a proppant mixture.

15. The method of claim 8, wherein receiving the first signal comprises receiving a first wireless signal from the sensor, wherein transmitting the second signal comprises transmitting a second wireless signal, the sensor and the repeater positioned in the fracture as part of a proppant mixture, the sensor being a first sensor of a plurality of sensors and the repeater being a first repeater of a plurality of repeaters, the plurality of repeaters including repeaters of more than one size, smaller repeaters of the plurality of repeaters being positioned farther from the wellbore than larger repeaters of the plurality of repeaters for creating a communication network for communicating location data for each sensor of the plurality of sensors to the acoustic signal generator, the location data being usable for mapping the fracture and adjusting a fracturing operation.

16. A proppant mixture comprising:
 a sensor; and
 a repeater, the proppant mixture being positionable in a fracture in a well for wirelessly communicating with an acoustic signal generator in a wellbore of the well to acoustically transmit information about the sensor for receipt by a distributed acoustic sensing system at least partially in the wellbore, wherein the repeater comprises:
  a wireless receiver for wirelessly receiving a first signal from the sensor, the first signal representing a location of the sensor in the fracture;
  a wireless transmitter for wirelessly transmitting a second signal based on the first signal; and
  a computing device communicatively coupled to the wireless receiver for determining a location of the sensor based on a strength of the first signal and communicatively coupled to the wireless transmitter for causing the second signal to represent the location of the sensor.

17. The proppant mixture of claim 16, wherein the sensor comprises:

a measurement device for determining a characteristic of a subterranean formation through which the fracture is formed; and
 a wireless transmitter for wirelessly transmitting a signal representing the characteristic and a location of the sensor in the fracture.

18. The proppant mixture of claim 16, wherein the wireless transmitter is operable for transmitting a request signal, the sensor being operable for transmitting the first signal in response to the sensor receiving the request signal, wherein the repeater further comprises a processing device communicatively coupled to the wireless receiver for determining a time between the repeater transmitting the request signal and the wireless transmitter receiving the first signal and for determining a location of the sensor based on the time, the processing device communicatively coupled to the wireless transmitter for causing the second signal to represent the location of the sensor.

19. The proppant mixture of claim 16, wherein the sensor is a first sensor of a plurality of sensors and the repeater is a first repeater of a plurality of repeaters, the plurality of repeaters including repeaters of more than one size, smaller repeaters of the plurality of repeaters being positionable farther from the wellbore than larger repeaters of the plurality of repeaters for creating a communication network for communicating location data for each sensor of the plurality of sensors to the acoustic signal generator, the location data being usable for mapping the fracture and adjusting a fracturing operation.

20. The proppant mixture of claim 16, wherein the acoustic signal generator is included in a bridge plug, the bridge plug being positionable downhole in the wellbore for sealing a portion of the wellbore during a fracturing operation.

\* \* \* \* \*